(12) United States Patent
Sychaleun et al.

(10) Patent No.: US 8,411,763 B2
(45) Date of Patent: *Apr. 2, 2013

(54) CABLE REDUCTION

(75) Inventors: Somsack Sychaleun, Kanata (CA);
Steve Beaudin, Nepean (CA);
Chun-Yun Jian, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,426

(22) Filed: Feb. 20, 2012

(65) Prior Publication Data

US 2012/0147978 A1 Jun. 14, 2012

Related U.S. Application Data

(63) Continuation of application No. 10/914,589, filed on Aug. 9, 2004, now Pat. No. 8,135,086.

(51) Int. Cl.
*H04B 3/00* (2006.01)

(52) U.S. Cl. ........ 375/257; 375/275; 375/267; 375/260; 375/299; 375/348; 375/349

(58) Field of Classification Search .................. 375/257, 375/275, 267, 260, 299, 348, 349
See application file for complete search history.

(56) References Cited

U.S. PATENT DOCUMENTS

| | | | | |
|---|---|---|---|---|
| 4,451,832 A | * | 5/1984 | Stites | ............................ 343/858 |
| 4,768,187 A | | 8/1988 | Marshall | |
| 4,839,894 A | | 6/1989 | Rudish et al. | |
| 5,216,434 A | | 6/1993 | Fukumura | |
| 5,289,505 A | | 2/1994 | LaRosa et al. | |
| 5,748,669 A | | 5/1998 | Yada | |
| 5,774,193 A | | 6/1998 | Vaughan | |
| 5,784,683 A | | 7/1998 | Sistanizadeh et al. | |
| 5,818,875 A | | 10/1998 | Suzuki et al. | |
| 5,832,389 A | | 11/1998 | Dent | |
| 5,883,901 A | | 3/1999 | Chiu et al. | |
| 6,011,513 A | | 1/2000 | Wilson et al. | |
| 6,088,381 A | | 7/2000 | Myers, Jr. | |
| 6,125,109 A | | 9/2000 | Fuerter | |
| 6,148,219 A | | 11/2000 | Engelbrecht et al. | |
| 6,178,158 B1 | | 1/2001 | Suzuki et al. | |

(Continued)

FOREIGN PATENT DOCUMENTS

| | | |
|---|---|---|
| EP | 1443594 A2 | 8/2004 |
| WO | 9744908 A1 | 11/1997 |

(Continued)

OTHER PUBLICATIONS

Unknown Author, "Applications of PIN Diodes," Agilent Technologies, May 25, 2004, 3 pages.

(Continued)

*Primary Examiner* — Kabir A Timory (57) ABSTRACT

The present invention provides combining and separation circuitry, which allows multiple signals in different frequency bands to travel in either direction over a single cable and be combined and separated as desired. In one embodiment, the combining and separation circuitry includes first, second, third, and fourth ports. The first port is configured to send or receive signals in a first frequency band, the second port is configured to send or receive signals in a second frequency band, and the third port is configured to send or receive DC signals, baseband signals, or a combination thereof. The fourth port is configured to be coupled to a cable in which the signals in the first and second frequency bands, as well as the DC and/or baseband signals, can be sent in either direction.

20 Claims, 7 Drawing Sheets

U.S. PATENT DOCUMENTS

| | | |
|---|---|---|
| 6,192,070 B1 | 2/2001 | Poon et al. |
| 6,252,548 B1 | 6/2001 | Jeon |
| 6,266,545 B1 | 7/2001 | Backman et al. |
| 6,366,789 B1 | 4/2002 | Hildebrand |
| 6,411,825 B1 | 6/2002 | Csapo et al. |
| 6,462,704 B2 | 10/2002 | Rexberg et al. |
| 6,522,642 B1 | 2/2003 | Scott |
| 6,535,732 B1 | 3/2003 | McIntosh et al. |
| 6,594,508 B1 | 7/2003 | Ketonen |
| 6,640,111 B1 | 10/2003 | Shapira |
| 6,657,978 B1 | 12/2003 | Millman |
| 6,760,342 B1 | 7/2004 | Skones et al. |
| 6,801,788 B1 | 10/2004 | Csapo et al. |
| 6,826,163 B2 | 11/2004 | Mani et al. |
| 6,831,901 B2 | 12/2004 | Millar |
| 6,963,305 B2 | 11/2005 | Knapp |
| 6,983,174 B2 | 1/2006 | Hoppenstein et al. |
| 7,038,621 B2 | 5/2006 | Gabriel et al. |
| 7,058,304 B2 * | 6/2006 | Tai et al. .................. 398/65 |
| 7,069,051 B1 | 6/2006 | Katz |
| 7,123,939 B1 | 10/2006 | Bird et al. |
| 7,181,243 B1 | 2/2007 | Nicholls et al. |
| 7,424,039 B2 | 9/2008 | Deane et al. |
| 7,729,726 B2 | 6/2010 | Beaudin et al. |
| 8,060,147 B2 | 11/2011 | Beaudin et al. |
| 2001/0044323 A1 | 11/2001 | Waylett |
| 2002/0132644 A1 | 9/2002 | Mellor et al. |
| 2002/0196497 A1 | 12/2002 | Locascio et al. |
| 2003/0071639 A1 | 4/2003 | Haag et al. |
| 2003/0109283 A1 | 6/2003 | Shapira et al. |
| 2003/0148747 A1 | 8/2003 | Yamamoto |
| 2004/0190479 A1 | 9/2004 | Deane et al. |
| 2004/0190480 A1 | 9/2004 | Deane et al. |
| 2004/0266356 A1 | 12/2004 | Javor et al. |
| 2005/0117545 A1 * | 6/2005 | Wittwer et al. .............. 370/332 |
| 2005/0215288 A1 | 9/2005 | Beaudin et al. |
| 2005/0250541 A1 | 11/2005 | Bird et al. |
| 2006/0003808 A1 | 1/2006 | Haskell et al. |
| 2006/0067262 A1 | 3/2006 | Troemel, Jr. |
| 2006/0252461 A1 | 11/2006 | Grant et al. |

FOREIGN PATENT DOCUMENTS

| | | |
|---|---|---|
| WO | 9926317 A1 | 5/1999 |
| WO | 0041339 A1 | 7/2000 |
| WO | 2005088764 A1 | 9/2005 |

OTHER PUBLICATIONS

European Search Report for European Patent Application No. 06795513.8 issued Dec. 30, 2011, 6 pages.

European Search Report for Patent Application 05718215.6 mailed Jan. 9, 2012, 4 pages.

International Search Report for PCT/IB2006/002575 mailed Feb. 8, 2007, 3 pages.

Final Office Action for U.S. Appl. No. 10/914,589 mailed Jun. 30, 2010, 18 pages.

Jaffe, J.S. et al., "Microwave Frequency Translator," IEEE Transactions on Microwave Theory and Techniques,vol. 13 Issue 3, May 1965, pp. 373-374.

Non-final Office Action for U.S. Appl. No. 10/914,589 mailed May 23, 2011, 13 pages.

Non-final Office Action for U.S. Appl. No. 10/914,589 mailed Feb. 17, 2009, 14 pages.

Non-final Office Action for U.S. Appl. No. 10/914,589 mailed Mar. 7, 2008, 17 pages.

Non-final Office Action for U.S. Appl. No. 10/914,589 mailed Nov. 25, 2009, 14 pages.

Non-final Office Action for U.S. Appl. No. 10/914,589 mailed Sep. 3, 2008, 13 pages.

Notice of Allowance for U.S. Appl. No. 10/914,589 mailed Nov. 2, 2011, 5 pages.

Notice of Pre-Appeal Decision from the US Board of Patents and Interferences for U.S. Appl. No. 10/914,589 mailed Dec. 27, 2010, 2 pages.

International Search Report for PCT/IB2005/000690 mailed Jul. 27, 2005, 2 pages.

* cited by examiner

CABLE REDUCTION

This application is a Continuation Application of U.S. patent application Ser. No. 10/914,589, entitled CABLE REDUCTION, filed Aug. 9, 2004, the disclosure of which is incorporated herein by reference in its entirety.

FIELD OF THE INVENTION

The present invention relates to radio frequency communications, and in particular to transmitting and receiving signals at different frequencies over a common cable.

BACKGROUND OF THE INVENTION

In many electronics environments, numerous cables are necessary to connect various types of electronic modules. Given the expense of cabling with respect to the ever-decreasing cost of electronics, cabling is often a significant expense. In cellular communication environments, the electronics used to facilitate receiving and transmitting signals are distributed between a base housing and a masthead, which is mounted atop a building, tower, or like mast structure. The actual antennas used for transmitting and receiving signals are associated with the masthead. The masthead will generally include basic electronics to couple the antennas to corresponding antenna feeder cables, which connect to transceiver and amplifier electronics located in the base housing.

Historically, the amount of electronics placed in the masthead has been minimized, due to inhospitable environmental conditions, such as lightning, wind, precipitation, and temperature extremes, along with the difficulty in replacing the electronics when failures occur. Maintenance of the masthead is time-consuming and dangerous, given the location of the masthead. Minimizing the electronics in the masthead has resulted in essentially each antenna being associated with a separate antenna feeder cable.

As time progresses, the cost of the electronics has been greatly reduced, whereas the cost of the antenna feeder cables has held relatively constant, if not increased. Thus, a decade ago the antenna feeder cables were an insignificant cost associated with a base station environment, whereas today the cost of the antenna feeder cables is a significant portion of the cost associated with the base station environment. Accordingly, there is a need to minimize the number of antenna feeder cables associated with a base station environment, without impacting the functionality or operability of the base station environment. Further, there is a need to minimize the increase in cost associated with the masthead and base housing electronics due to minimizing the number of antenna feeder cables required to connect the masthead electronics to the base housing electronics. Furthermore, it is also desirable to minimize the number of cables connecting two RF modules which may be located in the same housing.

SUMMARY OF THE INVENTION

The present invention provides combining and separation circuitry, which allows multiple signals in different frequency bands to travel in either direction over a single cable and be combined and separated as desired. In one embodiment, the combining and separation circuitry includes first, second, third, and fourth ports. The first port is configured to send or receive signals in a first frequency band, the second port is configured to send or receive signals in a second frequency band, and the third port is configured to send or receive DC and/or baseband signals in a third frequency band. The signals in the third frequency band may be DC, baseband, or a combination of DC and baseband signals. The fourth port is configured to be coupled to a cable in which the signals in the first and second frequency bands, as well as the DC or baseband signals, can be sent in either direction. The combining and separation circuitry may be constructed using one or more LC (inductor/capacitor) networks, which support the combining and separation of signals, depending on the direction in which the signals are traveling. Similar combining and separation circuitry may be provided at the other end of the cable such that electronics systems may communicate with each other in the different frequency bands over the cable.

In one embodiment, combining and separation circuitry is provided in both the masthead and base housing electronics in a base station environment. In such an environment, radio frequency transmit and receive signals may be transmitted within the first frequency band, synchronization signals and data may be transmitted within the second frequency band, and power may be supplied to the masthead from the base station using a DC signal. Also, communications between the masthead and base station may be facilitated using a baseband signal. All of these signals may be carried simultaneously over the cable. Additionally, the combining and separation circuitry may implement surge protection circuitry to protect associated electronics from electrical surges caused by electronic malfunction or lightning.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
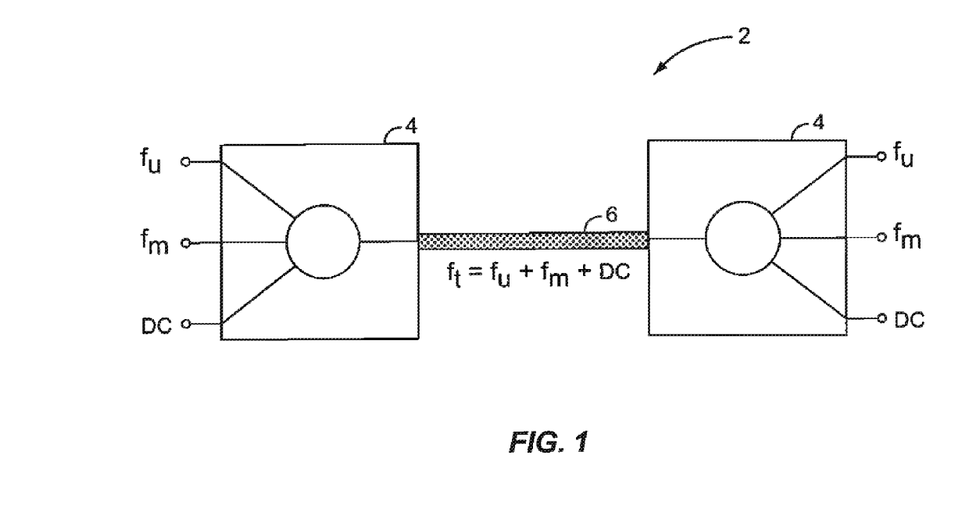
FIG. 1 is a block representation of a cable reduction system according to one embodiment of the present invention.

The present invention enables various signals at different frequencies to traverse a single cable in a simple and low-cost fashion. The invention is applicable in any environment where cable reduction is beneficial, such as between modules in any form of electronic system, or in a base station and masthead in a cellular communication environment. A block representation of the basic functionality of the present invention is illustrated in FIG. 1. As illustrated, a cable reduction system 2 will include combining and separation circuitry 4 coupled together by a cable 6. In one embodiment, the combining and separation circuitry 4 is configured to allow signals to traverse the cable 6 in both directions in various frequency bands. As illustrated, there are essentially three frequency bands making up the total frequency band $f_t$. The first frequency band is an upper frequency band $f_u$, which is configured to contain higher frequencies, such as radio frequencies. A second frequency band is the middle frequency band $f_m$, which includes frequencies in a band less than that defined by the upper frequency band $f_u$. The third frequency band may be reserved for DC, baseband, or a combination of DC and baseband signals. Notably, signals at frequencies in any of the bands ($f_u$, $f_m$, DC, or baseband) may traverse the cable 6 in either direction. Preferably, signals traversing the cable in either direction will operate at different frequencies so as to minimize interference with one another. Accordingly, the cable 6 will include signals at a variety of frequencies within the various frequency bands, such that the frequencies represented at any given time in the signals carried by the cable 6 will be $f_u+f_m+DC$ (and/or baseband). Detailed examples are provided further below.

Figure 2:
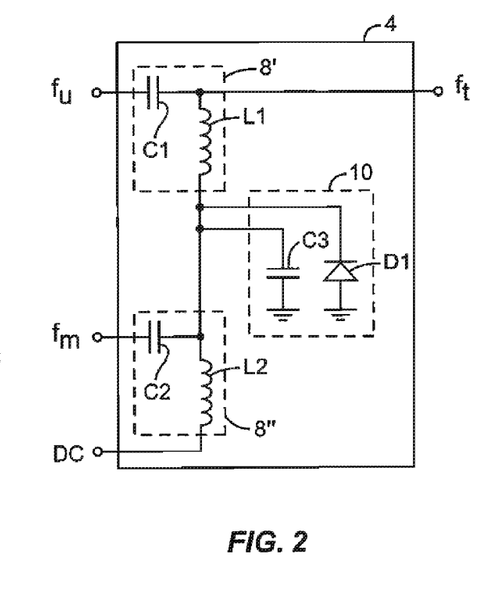
FIG. 2 is a block representation of combining and separation circuitry according to one embodiment of the present invention.

Turning now to FIG. 2, exemplary separation and combining circuitry 4 is illustrated according to one embodiment of the present invention. As illustrated, the separation and combining circuitry 4 will include four ports for receiving or providing signals at the respective frequencies. The separation and combining circuitry 4 of FIG. 2 is a dual bias tee configuration, wherein a first bias tee circuit 8' is configured to pass frequencies from the port for the upper frequency band $f_u$ to the port for the total frequency band $f_t$, and vice versa, such that signals coming in to the total frequency port are filtered so that only the signals in the upper frequency band are provided out of the combining and separation circuitry 4 at the port for the upper frequency band $f_u$. The bias tee circuitry 8' provides the necessary filtering for such operation. Thus, the representative LC circuit includes a capacitor C1 configured for passing frequencies in the upper frequency band in either direction as well as inductor L1 which acts as a high impedance choke for signals in the upper frequency band.

The combining and separation circuitry 4 also includes a second bias tee circuit 8", which is coupled to the first bias tee circuit 8'. The second bias tee circuit 8" includes a port for receiving or providing signals in the middle frequency band $f_m$. In operation, signals provided to the port for the middle frequency band $f_m$ are passed through the capacitor C2, through the inductor L1 of the first bias tee circuit 8', and out through the port for the total frequency band $f_t$. The capacitor C2 and inductor L1 are configured to pass signals in the middle frequency band $f_m$. Further, signals within the middle frequency band that arrive at the combining and separation circuitry 4 at the port for the total frequency band $f_t$ are passed through inductor L1 and capacitor C2 and are output through the port for the middle frequency band $f_m$. Given the interplay between the filtering circuitry of the bias tee circuits 8' and 8", signals most sensitive to attenuation are provided a path with the least impedance for the given operating frequency. In the illustrated embodiment, the signals in the upper frequency band $f_u$ are deemed most sensitive to attenuation and most important, and are thus provided a path through capacitor C1, wherein the signals in the upper frequency band $f_u$ are passed with relatively minimal attenuation. In contrast, the capacitor C1 may filter frequencies outside of the upper frequency band $f_u$. The values for capacitor C2 and inductor L1 are chosen to minimize the impact on the upper frequency band $f_u$ while providing the least impedance possible in light of these design limitations for signals in the middle frequency band $f_m$ that are passing in either direction between the ports for the middle frequency band $f_m$ and the total frequency band $f_t$.

The second bias tee circuit 8" also includes a third port for providing or receiving a DC (and/or baseband) signal. The DC (and/or baseband) signal path between the port for the DC signal and the port for the total frequency band $f_t$ will be through the inductors L1 and L2. The effect of the dual bias tee configuration of the combining and separation circuitry 4 is such that the signals in the upper frequency band $f_u$, middle frequency band $f_m$, or at DC (and/or baseband) are able to pass in either direction through the combining and separation circuitry 4 in a simultaneous fashion without causing significant interference with other signals. Further, signals at different frequencies may be provided in the same direction traveling in either direction through the combining and separation circuitry 4, regardless of in which direction they are traveling. Thus, the combining and separation circuitry 4 provides for simple and effective multiplexing and de-multiplexing functions in both directions in a simultaneous fashion.

The combining and separation circuitry 4 may also include protection circuitry 10, such as that for providing lightning protection. The lightning protection circuitry 10 may include various components for handling an electrical surge and directing that energy to ground. As illustrated, the lightning protection circuitry 10 includes a capacitor C3 and a diode D1 in parallel to ground from a node interconnecting the bias tee circuitries 8' and 8". The diode D1 may be a high voltage diode or gas discharge tube commonly used in lightning protection applications. Those skilled in the art will recognize that the components illustrated in the combining and separation circuitry 4 are for illustrative purposes only, and the actual circuit implementations may include more complex filtering networks having multiple components, which may be active or passive.

In a more general sense capacitor C1 may represent any high pass filter with a cut off frequency which falls between frequency bands $f_u$ and $f_m$, such that $f_u$ falls within the passband of the high pass filter and passes with relatively little loss, while signals within band $f_m$ fall outside of the passband and are presented with a high impedance. Similarly, inductor L1 may represent a low pass filter whose cut off frequency is below frequency band $f_u$ but above frequency band $f_m$ such as to provide a high impedance at $f_u$ while allowing signals within band $f_m$ to pass. Capacitor C2 may also represent a high pass filter, which will allow signals within frequency band $f_m$ to pass while providing a high impedance to signals at DC or baseband. Finally, inductor L2 may represent a low pass filter whose cutoff frequency is below frequency band $f_m$, thereby providing a high impedance to signals within frequency band $f_m$, yet of sufficient bandwidth to allow the required DC or baseband signals to pass.

Figure 3:
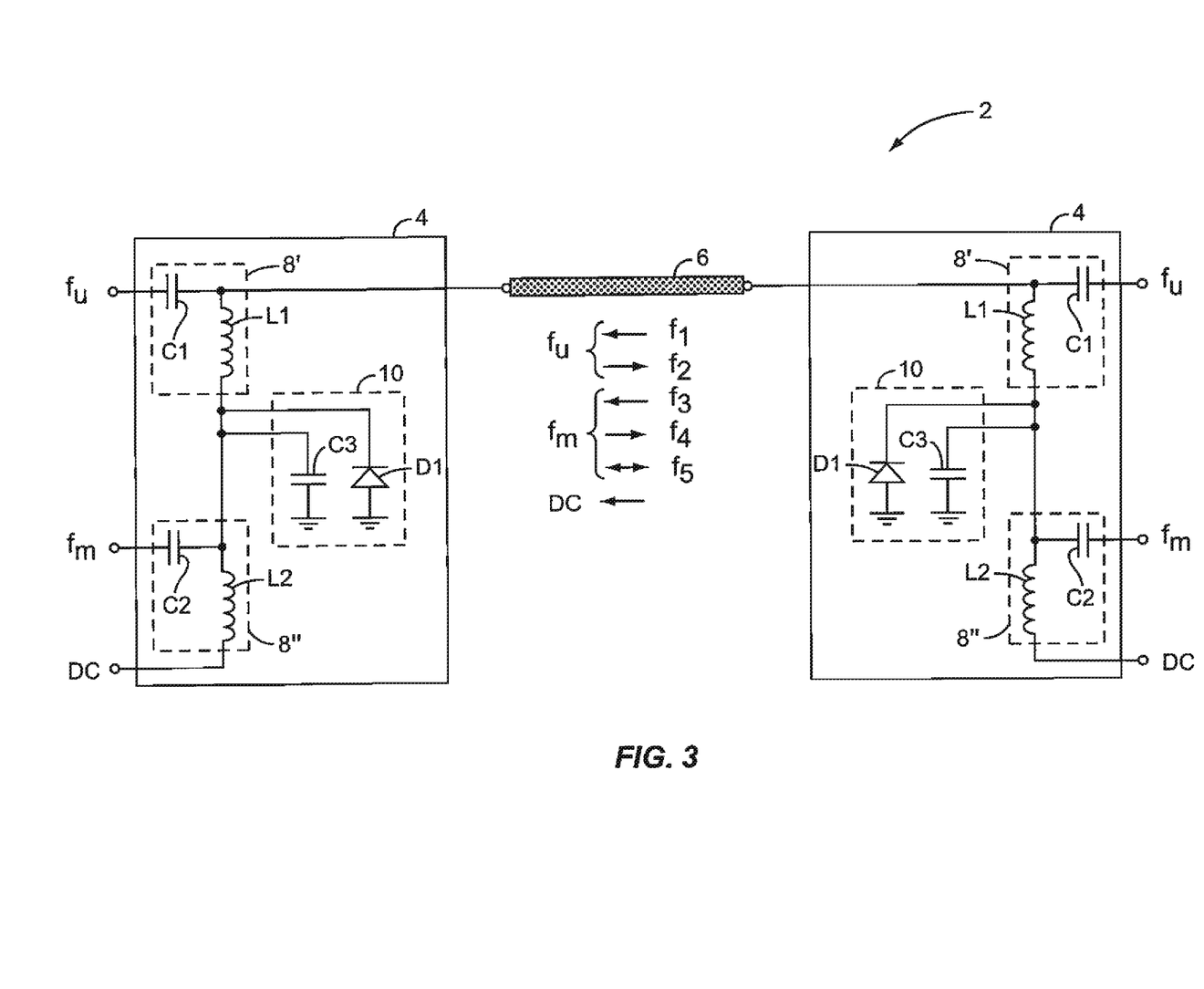
FIG. 3 is an exemplary embodiment of a cable reduction system according to one embodiment of the present invention.

Turning now to FIG. 3, an exemplary cable reduction system 2 is illustrated to incorporate the combining and separation circuitry 4 illustrated in FIG. 2. Notably, the same or substantially similar configuration for the combining and separation circuitries 4 on either end of the cable 6 is employed. In this example, two signals operating at first and second frequencies $f_1$ and $f_2$ are within the upper frequency band $f_u$. These signals flow in opposite directions between the combining and separation circuitries 4. As such, the first signal operating at the first frequency is traveling from right to left, wherein the second signal operating at the second frequency is traveling from left to right across the cable 6. Within the middle frequency band, there are three signals operating at frequencies $f_3$, $f_4$, and $f_5$. The first signal operating at frequency $f_3$ is traveling right to left, the second signal operating at frequency $f_4$ is traveling left to right, and the third signal operating at frequency $f_5$ may travel in either direction. The third signal may represent bidirectional data communications that occur at a given baseband frequency. A DC signal, such as that for providing power, is provided from right to left. A baseband signal could either travel from left to right, right to left, or may be bi-directional, depending on the application. At any given time, the cable 6 may include signals at each of the five frequencies ($f_1$ through $f_5$), as well as the DC or baseband signal. When the combining and separation circuitry 4 is separating signals, only signals within the given frequency band are output at the corresponding port, and all signals outside of the frequency band are sufficiently suppressed through filtering.

The present invention is particularly beneficial in the reduction of cabling required in a base station environment. In general, signals that were normally transmitted over separate cables are frequency shifted about different center frequencies, combined, and sent over a single cable. At a receiving end of the cable 6, the combined signals are recovered and processed in traditional fashion. The invention is particularly useful in a diversity environment, wherein multiple antennas are used to receive a common signal. In such an environment, certain of the signals received from the main and diversity antennas are shifted in frequency, combined with one another, and transmitted over a common cable. Accordingly, each sector, which includes a main and one or more diversity antennas, will need only one cable for transmitting the received signals from the antennas to electronics in a base housing.

Figure 4:
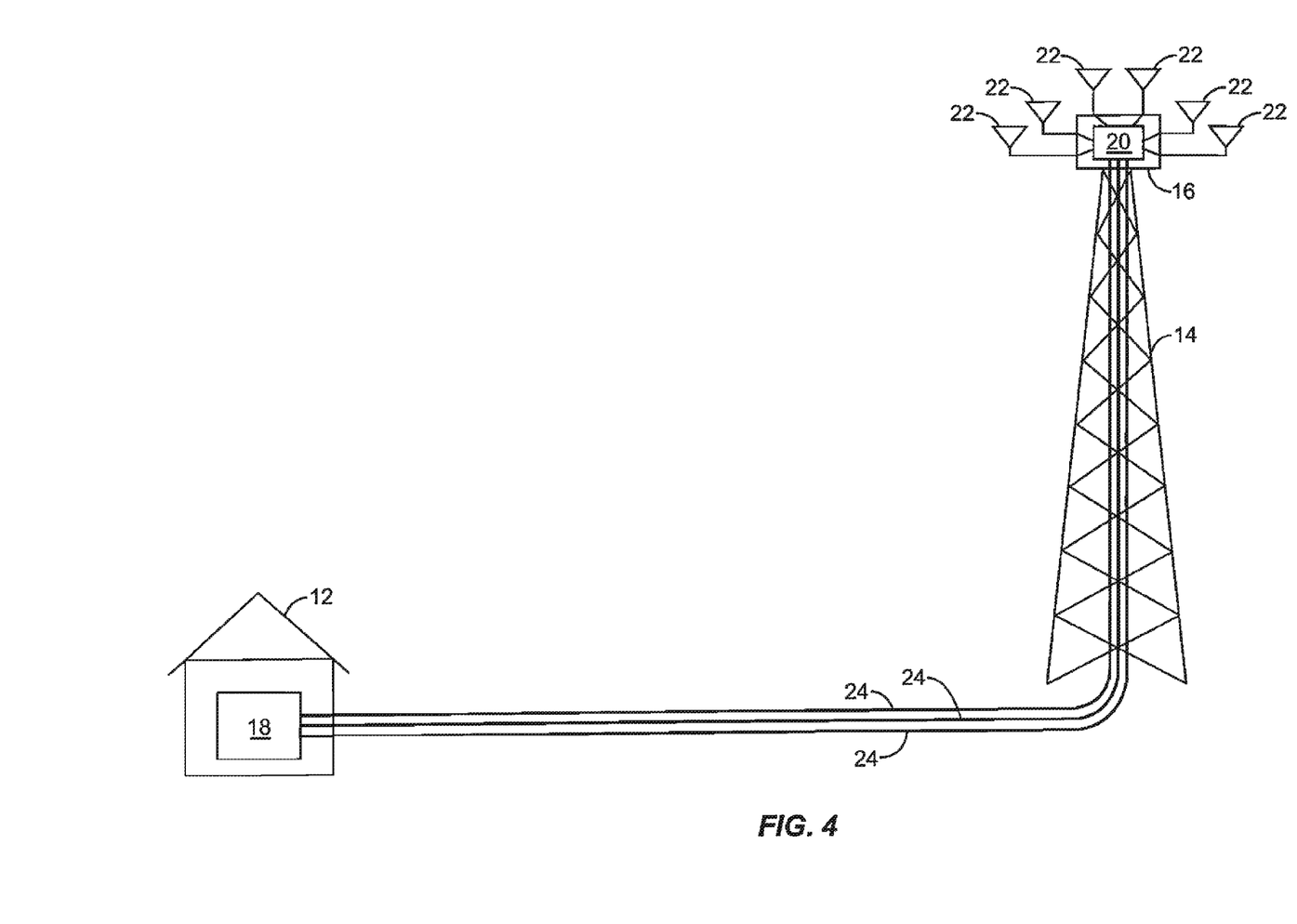
FIG. 4 is a block representation of a base station environment according to one embodiment of the present invention.

Further, the present invention allows power, data, and synchronization signals to be provided over the same cable, which is used for the radio frequency signals. An overview of a base station environment is illustrated in FIG. 4 according to one embodiment of the present invention. The illustrated base station environment is exemplary of the primary components in a cellular access network. A base housing 12 is provided in a secure location in association with a mast 14, which may be a tower or other structure near the top of which is mounted a masthead 16. Communications for the base station environment are distributed between the masthead 16 and the base housing 12. In particular, the base housing 12 will include base housing electronics 18, which include the primary transceiver and power amplification circuitry required for cellular communications. The masthead 16 will include masthead electronics 20, which generally comprise the limited amount of electronics necessary to operatively connect with multiple antennas 22, which are mounted on the masthead 16. The masthead electronics 20 and the base housing electronics 18 are coupled together with one or more feeder cables 24. For the illustrated embodiment, there are six antennas 22 divided into three sectors having two antennas 22 each. For each sector, one feeder cable 24 is provided between the masthead electronics 20 and the base housing electronics 18. Accordingly, there are three feeder cables 24 illustrated in FIG. 4. In traditional base station environments 10, each antenna would be associated with one feeder cable 24.

Figure 5:
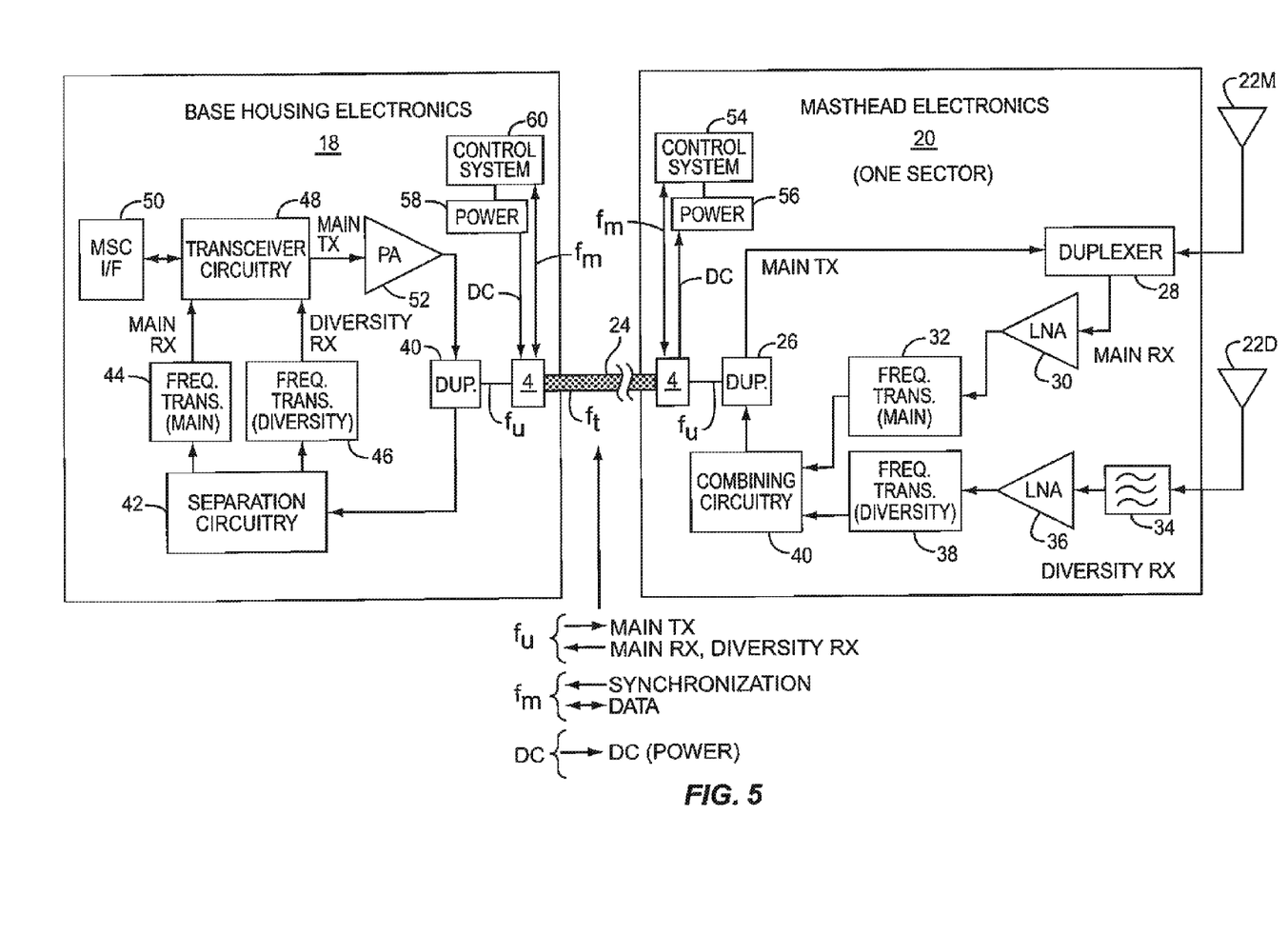
FIG. 5 is a block representation of base housing electronics and masthead electronics according to a first embodiment of the present invention.

Turning now to FIG. 5, a block representation of the base housing electronics 18 and one sector of the masthead electronics 20 is provided according to one embodiment of the present invention. Notably, there are two antennas 22 illustrated. A first antenna is referred to as a main antenna 22M, and the second antennas is referred to as a diversity antenna 22D. For signals transmitted from the main antenna 22M, a signal to be transmitted will be provided over the feeder cable 24 to a duplexer 26 in the masthead electronics 20. The signal to be transmitted (MAIN TX) is sent to another duplexer 28 and transmitted via the main antenna 22M.

For receiving, signals transmitted from remote devices will be received at both the main antenna 22M and the diversity antenna 22D. The signals received at the main antenna 22M are referred to as the main receive signals (MAIN RX), and the signals received at the diversity antenna 22D are referred to as the diversity receive signals (DIVERSITY RX). In operation, the main receive signal received at the main antenna 22M is routed by the duplexer 28 to a low noise amplifier (LNA) 30, which will amplify the main receive signal and present it to main frequency translation circuitry 32. The main frequency translation circuitry 32 will effect a frequency translation, which is essentially a shift of the main receive signal from being centered about a first center frequency to being centered around a second center frequency. The main frequency translation circuitry 32 may take the form of a mixer, serrodyne, or the like, which is capable of shifting the center frequency of the main receive signal.

Similarly, the diversity receive signal received at the diversity antenna 22D may be filtered via a filter 34 and amplified using an LNA 36 before being presented to diversity frequency translation circuitry 38. The diversity frequency translation circuitry 38 will effect a frequency translation of the diversity receive signal from being centered about the first center frequency to being centered about a third center frequency. Preferably, the first, second, and third center frequencies are sufficiently different as to allow signals being transmitted or received at those frequencies to be combined without interfering with one another.

Figure 6:
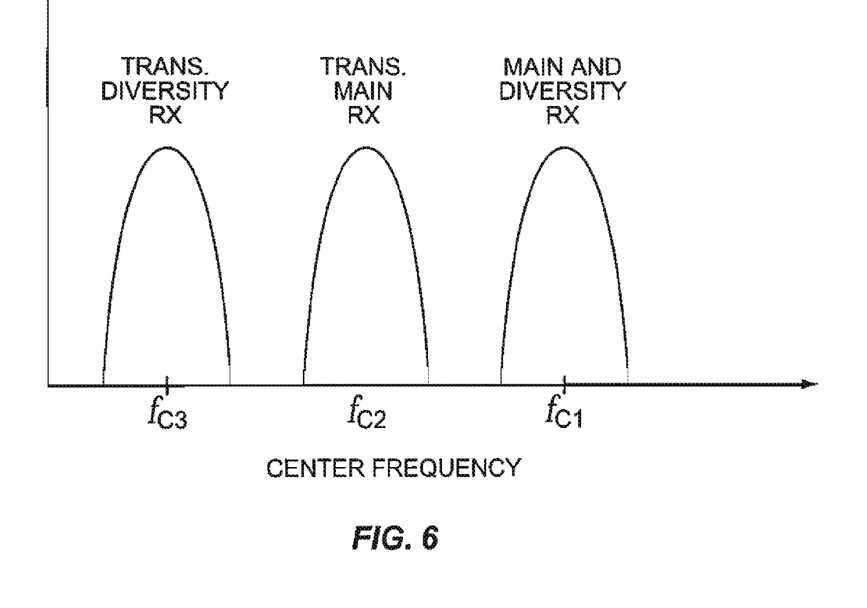
FIG. 6 is a graphical illustration of a frequency translation process according to the embodiment of FIG. 5.

With reference to FIG. 6, a graphical illustration of the frequency translation process is provided. As illustrated, the main and diversity receive signals are centered about the first center frequency $f_{C1}$, wherein the translated main receive signal is centered about center frequency $f_{C2}$ and the translated diversity receive signal is centered about center frequency $f_{C3}$. The center frequencies are sufficiently spaced along the frequency continuum to avoid any interference between the signals transmitted on those center frequencies.

Returning to FIG. 5, the translated main receive signal and the translated diversity receive signal provided by the main and diversity frequency translation circuitries 32 and 38 are then combined with combining circuitry 40 and presented to the duplexer 26. The duplexer 26 will then transmit the composite signal to the base housing electronics 18.

The composite signal will be received by a duplexer 40 and provided to separation circuitry 42, which will effectively separate the translated main receive signal and the translated diversity receive signal and provide them to main frequency translation circuitry 44 and diversity frequency translation circuitry 46, respectively. The translated main and diversity receive signals will be shifted back to being centered about the first center frequency $f_{C1}$, which was originally used for transmitting the main and diversity receive signals from the remote device. Accordingly, the main and diversity receive signals are recovered by the main and diversity frequency translation circuitries 44 and 46 and provided to transceiver circuitry 48, wherein the receive signals are processed in traditional fashion and forwarded to a mobile switching center (MSC) or other device via an MSC interface 50.

For transmitted signals, the base housing electronics 18 will generate a main transmit signal (MAIN TX) using the transceiver circuitry 48 and provide the main transmit signal to a power amplifier (PA) 52. The amplified main transmit signal will then be transmitted to the duplexer 40, which will send the amplifier main transmit signal over the feeder cable 24 toward the masthead electronics 20, which will route the main transmit signal to the main antenna 22M as described above.

The previous embodiment is configured to minimize the impact on the existing transceiver circuitry 48 in the base housing electronics 18. In an alternative embodiment, the translated main and diversity receive signals may be presented directly to the transceiver circuitry 48, which may be modified to be able to process the signals directly, instead of requiring them to be translated back to being centered about their original center frequency, $f_{C1}$. Further, the receive signals that are translated may be shifted up or down in frequency to varying degrees. For example, the receive signals may be shifted down to an intermediate frequency, to a very low intermediate frequency, or to a near DC frequency, such as that used in Zero IF architectures.

Power may be fed from the base housing electronics 18 to the masthead electronics 20 via the antenna feeder. Power would be coupled to the feeder cable 24 and off of the feeder cable 24 using the combining and separation circuitries 4. For example, the power supply 56 of the masthead electronics 20 may receive power originating from a power supply 58 of the base housing electronics 18 via the combining and separation circuitries 4 and the feeder cable 24. Generally, the power supply is DC. A bidirectional communication link between the control systems 60 and 54 of the base housing electronics 18 and masthead electronics 20, respectively, may also be desirable and implemented. The communication link could be within a middle frequency band, $f_m$, and may be facilitated over the feeder cable 24 using the combining and separation circuitry 4. Alternatively, the communication link could be implemented at baseband and superimposed over top of the DC power voltage.

Furthermore, if it is desirable to control the frequency translation to a high level of precision, a synchronization signal, such as a clock signal ($f_{CLK}$), in the form of a sine wave could be fed up the feeder cable 24 from the base housing electronics 18 and be extracted by the masthead electronics 20 using the combining and separation circuitry 4. The clock signal, $f_{CLK}$, could be a sine wave in the range of 100 to 200 MHz, which is also within the middle frequency band, $f_m$, to facilitate separation from the RX and TX signals.

Redundancy is often an issue for the masthead electronics 20. It is therefore desirable that a minimum amount of functionality be maintained in the event of a hardware failure with either the LNAs or frequency translation circuitry. It would therefore be advantageous in both the main and diversity receive paths be equipped with frequency translation circuitry. If one frequency translation circuit 32 should fail, the main signal would pass through the redundant circuitry unshifted and remain at its original frequency. In such an event the main receive signal could propagate downwards to the base housing electronics 18 at its original RF frequency and the diversity receive signal would continue to be propagated as described.

Figure 7:
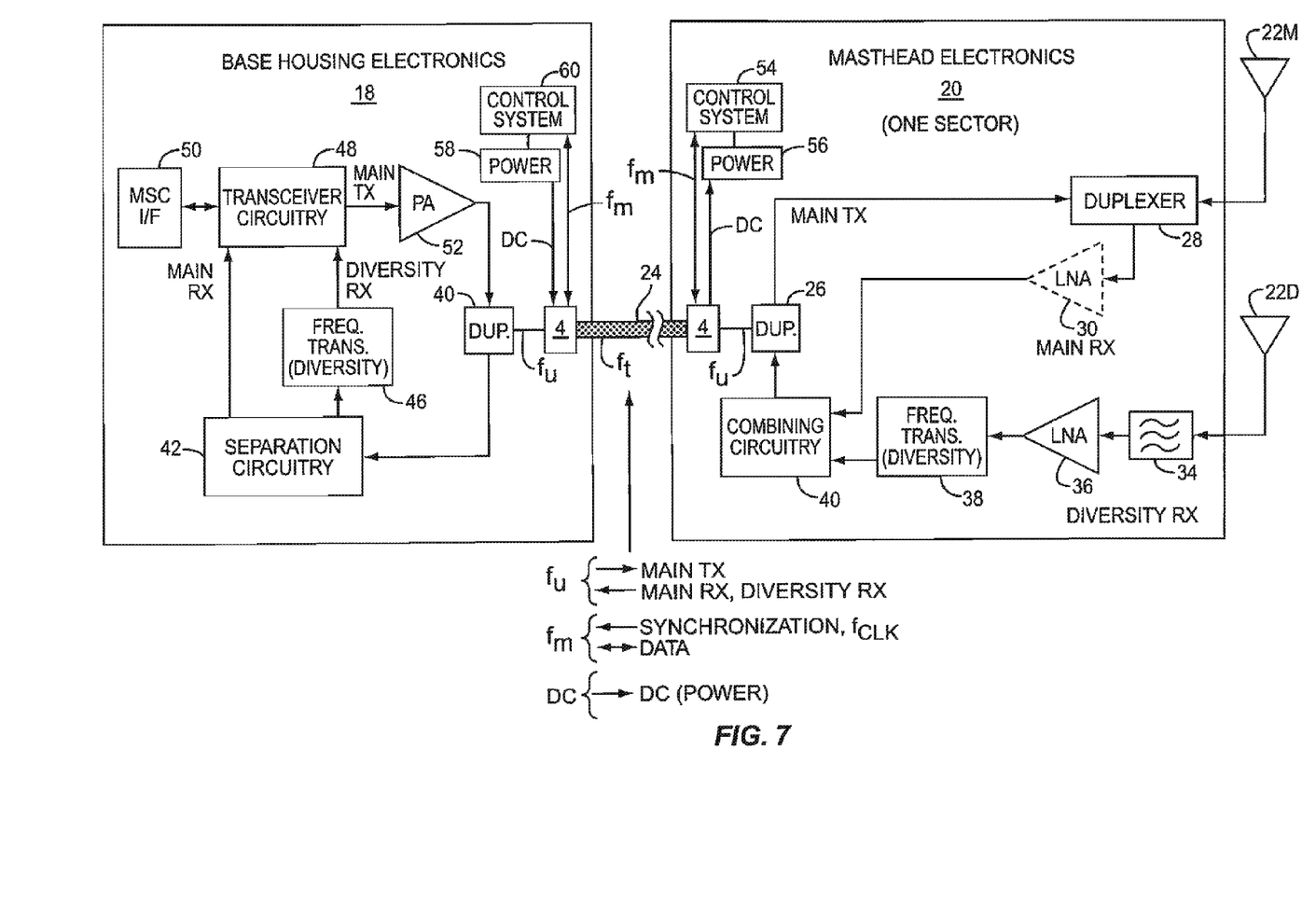
FIG. 7 is a block representation of base housing electronics and masthead electronics according to a second embodiment of the present invention.

Turning now to FIG. 7, a second embodiment of the present invention is illustrated. In this embodiment, the main receive signal is not translated, while the diversity receive signal is translated. Thus, the main receive signal and a translated diversity receive signal are combined in the masthead electronics 20 and sent over the feeder cable 24 to the base housing electronics 18. In particular, the main receive signal is received at main antenna 22M, and forwarded to combining circuitry 40 via the duplexer 28, and through an LNA 30. The diversity receive signal is received at diversity antenna 22D, filtered by the filter 34, amplified by the LNA 36, and translated from the first center frequency $f_{C1}$ to a second center frequency $f_{C2}$ by the diversity frequency translation circuitry 38. The main receive signal and the translated diversity receive signal are combined by combining circuitry 40 and sent to duplexer 26 for delivery to the base housing electronics 18 over the feeder cable 24. Upon receipt, the duplexer 40 at the base housing electronics 18 will send a composite receive signal to the separation circuitry 42, which will provide the main receive signal to the transceiver circuitry 48, and the translated diversity receive signal to the diversity frequency translation circuitry 46, which will translate the translated diversity receive signal back to being centered about center frequency $f_{C1}$ to effectively recover the diversity receive signal, which is then provided to the transceiver circuitry 48 for processing. The main transmit signal is transmitted from the main antenna 22M as described in association with FIG. 5.

Figure 8:
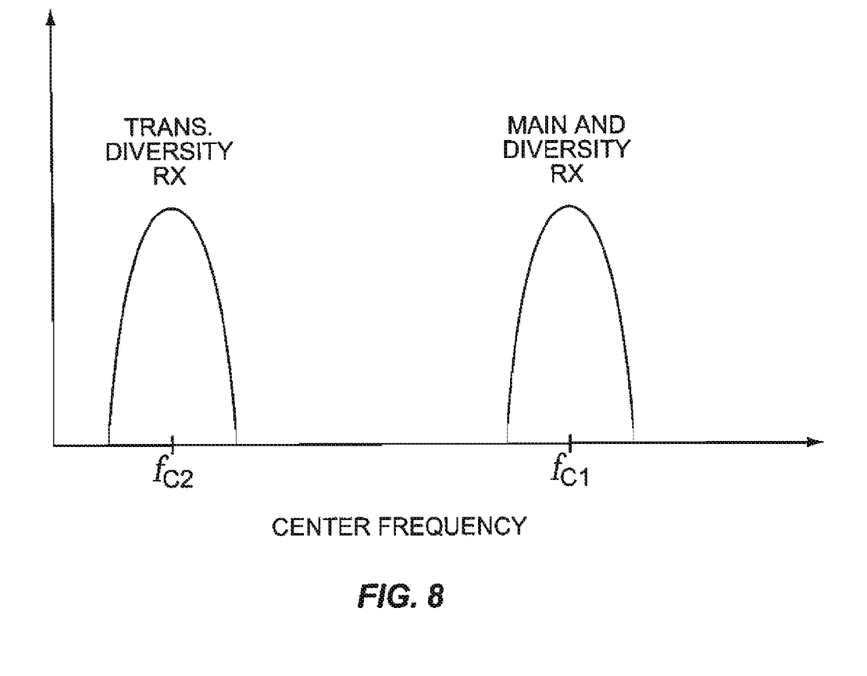
FIG. 8 is a graphical illustration of a frequency translation process according to the embodiment of FIG. 7.

With reference to FIG. 8, a graphical illustration of the translation of the diversity receive signal is shown, as processed in the embodiment of FIG. 7. As illustrated, the translated diversity receive signal is shifted to be centered about center frequency $f_{C2}$, wherein both the main and the original diversity receive signals are centered about center frequency $f_{C1}$.

If a masthead LNA is not desired or needed for the main receive signal, the invention can be further simplified by removing the LNA 30 and Duplexer 28 and combining circuitry 40. In such a case, both the transmit and main receive signals can be fed directly to the duplexer 26, where they will be combined with a translated diversity receive signal. The duplexer 26 would be designed such that the main filter encompass both the main transmit and main receive frequencies, and the other filter would encompass a shifted diversity receive frequency. This implementation would provide a simpler and less costly module while minimizing transmit path loss.

The advantages of this embodiment are twofold. Firstly, the main receive path can be composed of only passive components, thereby improving reliability. Alternatively, if an LNA 30 is desired at the masthead 16 for both the main and diversity receive signals, this embodiment remains simpler since only the diversity receive frequency needs to be translated at the mast, simplifying the electronics and frequency plan.

Figure 9:
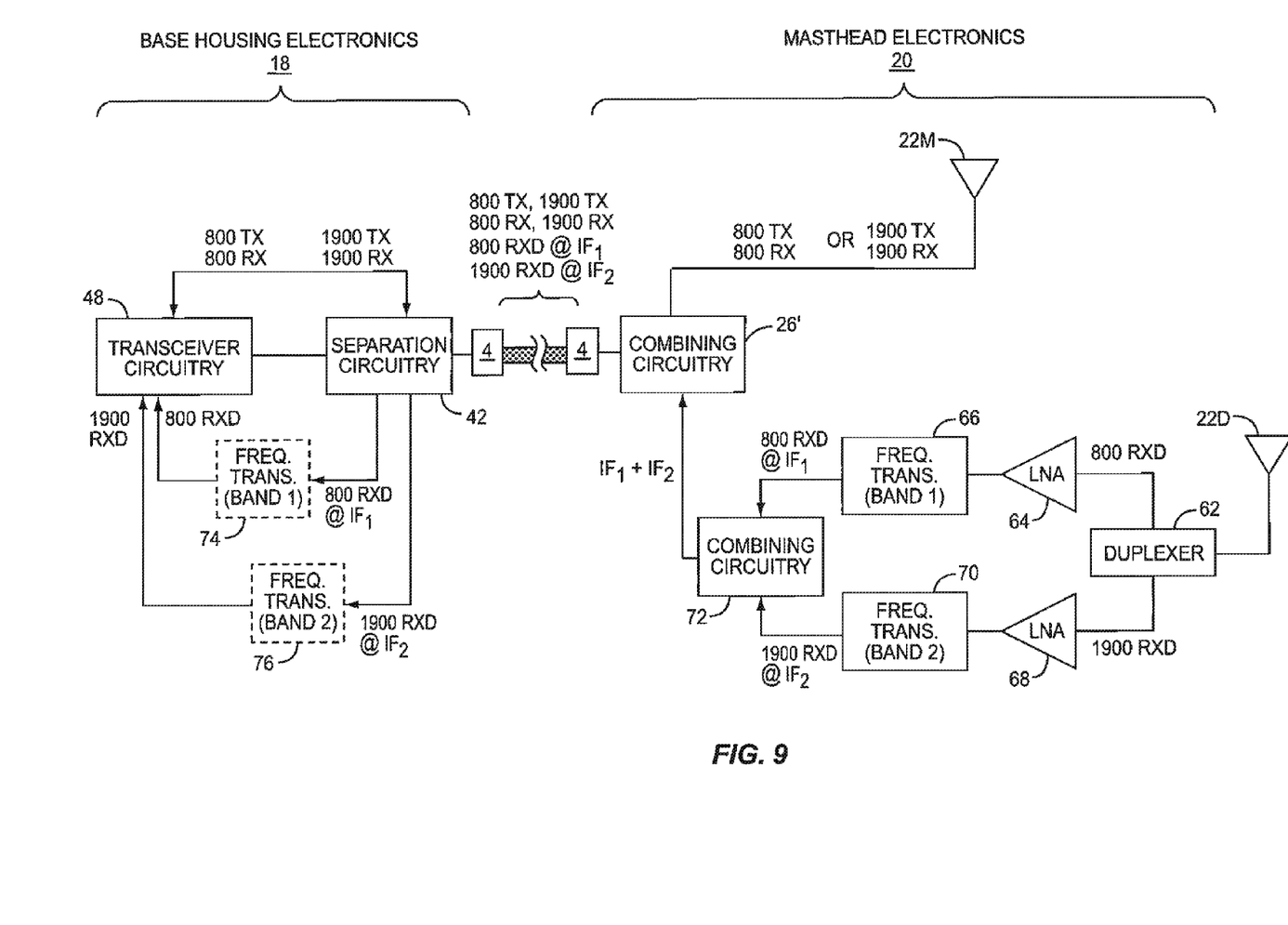
FIG. 9 is a block representation of base housing electronics and masthead electronics according to a third embodiment of the present invention.

Turning now to FIG. 9, a multi-band implementation of the present invention is illustrated. A multi-band communication environment is one in which the same or different cellular communication techniques are supported by a base station environment. As illustrated, a single base housing 12 is used, but different base housings 12 may be used for the different frequency bands. In many instances, the different modes of communication, whether incorporating the same or different underlying communication technologies, are centered about different center frequencies. Two common frequencies about which cellular communications are centered are 800 MHz and 1900 MHz. Accordingly, the base station environment must be able to transmit and receive signals at both 800 MHz and 1900 MHz, and may require diversity antennas 22D to assist in receiving signals. In operation, received signals in the 800 or 1900 MHz bands (BAND 1 and BAND 2, respectively) may be received at diversity antenna 22D, wherein a duplexer 62 will send 800 MHz receive signals (800 RXD) through LNA 64 to BAND 1 frequency translation circuitry 66, which will translate the 800 MHz receive signal about a different center frequency. In this example, assume the BAND 1 frequency translation circuitry downconverts the 800 MHz receive signal to a first intermediate frequency ($IF_1$), wherein the downconverted signal is generally referred to as 800 $RXD@IF_1$. Similarly, 1900 MHz receive signals (1900 RXD) will be provided through LNA 68 to BAND 2 frequency translation circuitry 70, which will downconvert the 1900 MHz receive signal to a second intermediate frequency ($IF_2$), wherein the downconverted signal is represented as 1900 $RXD@IF_2$.

The 800 $RXD@IF_1$ and 1900 $RXD@IF_2$ signals are combined using combining circuitry 72 to form a composite signal $IF_1+IF_2$, which is provided to combining circuitry 26', which will combine the composite signal $IF_1+IF_2$ with any signals received at the main antenna 22M, and in particular, 800 MHz and 1900 MHz receive signals (800 RX and 1900 RX). Thus, the combining circuitry 26' may combine the 800 and 1900 MHz receive signals with the composite $IF_1+IF_2$ signal and present them over the feeder cable 24 to separation circuitry 42 provided in the base housing electronics 18 via the combining and separation circuitry 4. The separation circuitry 42 will provide the 800 and 1900 MHz signals to the transceiver circuitry 48, as well as send the 800 $RXD@IF_1$ and 1900 $RXD@IF_2$ (translated) signals to respective BAND 1 and BAND 2 frequency translation circuitry 74 and 76. The BAND 1 frequency translation circuitry 74 may upconvert the 800 $RXD@IF_1$ signal to recover the original 800 RXD signal, and the BAND 2 frequency translation circuitry 76 will process the 1900 $RXD@IF_2$ signal to recover the original 1900 RXD signal. The 800 RXD and 1900 RXD signals are then provided to the transceiver circuitry 48 for processing in traditional fashion. As noted for the previous embodiment, the transceiver circuitry 48 may be modified to process the downconverted or otherwise translated signals without requiring retranslations back to the original center frequencies, as provided by the BAND 1 and BAND 2 frequency translation circuitry 74 and 76.

Accordingly, the above system provides for translating signals from one or more antennas 22 in a base station environment in a manner allowing the translated signals to be combined with one another and other untranslated signals for transmission over a common antenna feeder 24. This system is applicable to single and multi-band communication environments, and is not limited to communication technologies or particular operating frequencies. In general, the translation of received signals need only operate such that when the signals are combined with other signals, there is no interference or the interference is otherwise minimal or manageable. Further, the receive signals may be from any spatially diverse array of antennas for one or more sectors. As noted, two base housings 12 that operate in different bands may share the same feeder cables 24 and masthead 16.

Redundancy is a key issue for masthead electronics 20. Active components which are used in the LNA 30 and frequency translation circuitry 32, 38 are less reliable than passive components used to implement the duplexers 26, combining circuitry 40, and filters 34. As such, it may be necessary to bypass the LNAs 30 within the module. An LNA bypass is standard practice for masthead LNAs 30.

More important is redundancy in the frequency translation circuitry 32, 38. Since the objective is to transmit two receive signals, main and diversity, down the same antenna feeder 24 to the base housing electronics 18, loss of the frequency translation function means that only one of the receive signals can be relayed to the base housing electronics 18. It is therefore important to consider redundancy schemes in practice.

One approach is to simply include multiple levels of redundancy within each circuit block. A more sophisticated scheme would be to further use frequency translation circuitry on both the main receive and diversity receive signals as shown in FIG. 5. However, the frequency translation circuitry 32, 38 should be designed as to allow a signal to pass through with relatively lithe attenuation in the event of a hardware failure. Such would be the case with a serrodyne implemented using exclusively shunt or reflection type switches. The combining circuitry 40 could be designed to accept a signal at the translated receive frequency or original receive frequency on either port. The frequency translation circuitry 32, 38 would only be used in one branch at any given time, and in the other branch the signal would be passed through the frequency translation circuitry with little or no effect. In the event that the active frequency translation circuitry 32, 38 should fail, the unused frequency translation circuitry 32, 38 could be turned on to implement the frequency translation on this branch, and the failed frequency translation circuitry 32, 38 would then allow the signal to pass through untranslated.

Finally, in cases where four-branch receive diversity is used, it is conceivable that each sector contain one transmit signal and four receive signals. In such a case the present invention could easily be expanded to translate the frequency of all receive signals or alternately on the three diversity receive signals to separate frequencies and combine them all onto one feeder cable 24 where they would be separated by another circuit at the base station housing 12.

Those skilled in the art will recognize improvements and modifications to the preferred embodiments of the present invention, and will appreciate the applicability of the present invention to any system with components connected with multiple cables. All such improvements and modifications are considered within the scope of the concepts disclosed herein and the claims that follow.

What is claimed is:
1. A method of combining signals on a common cable, comprising:
    transmitting a first signal at a first frequency in a first frequency band in a first direction between first and fourth ports of circuitry having first, second, third, and fourth ports;
    transmitting a second signal at a second frequency in the first frequency band in a second direction between the first and fourth ports, the second direction being opposite to the first direction;
    transmitting a third signal at a third frequency in a second frequency band in a third direction between the second and fourth ports;
    transmitting a fourth signal at a fourth frequency in the second frequency band in a fourth direction between the second and fourth ports, the fourth direction being opposite to the third direction; and
    transmitting an additional signal between the third and fourth ports.

2. The method of claim 1, wherein transmitting an additional signal comprises transmitting an additional signal in one direction between the third and fourth ports.

3. The method of claim 1, wherein transmitting an additional signal comprises transmitting an additional signal in both directions between the third and fourth ports.

4. The method of claim 1, wherein the additional signal is a DC signal.

5. The method of claim 1, wherein the additional signal is a baseband signal.

6. The method of claim 1, wherein the additional signal comprises a DC signal and a baseband signal.

7. The method of claim 1, comprising:
providing a first impedance between the first and fourth ports;
providing a second impedance between the second and fourth ports; and
providing a third impedance between the third and fourth ports.

8. The method of claim 7, wherein providing the first, second and third impedances comprises providing first and second filter networks.

9. The method of claim 8, comprising providing protection circuitry for coupling to ground.

10. The method of claim 9, wherein providing protection circuitry comprises providing a network of at least one capacitor coupled in parallel to at least one diode or gas discharge tube.

11. The method of claim 1, wherein the circuitry is associated with further circuitry having fifth, sixth, seventh, and eighth ports, the method further comprising:
coupling the common cable between the fourth port and the eighth port; and
transmitting the first signal in the first direction between the fifth and eighth ports;
transmitting the second signal in the second direction between the fifth and eighth ports;
transmitting the third signal in the third direction between the sixth and eighth ports;
transmitting the fourth signal in the fourth direction between the sixth and eighth ports; and
transmitting the additional signal between the seventh and eighth ports.

12. The method of claim 11, comprising:
locating the circuitry in a base housing of a base station;
locating the further circuitry in a masthead of the base station; and
wherein the common cable extends between the base housing and the masthead.

13. The method of claim 12, comprising using the first frequency band for transmit and receive signals in a wireless communication network.

14. The method of claim 13, comprising using the second frequency band for a synchronization signal.

15. The method of claim 13, comprising using the second frequency band for data transmission.

16. A method of combining signals on a common cable, comprising:
providing first, second, third and fourth ports;
providing a first filter network between the first port, the fourth port and a first node;
providing a second filter network between the second port, the third port and a second node; the second node being coupled to the first node;
providing bidirectional passage of signals within a first frequency band between the first and fourth ports;
providing bidirectional passage of signals within a second frequency band between the second and fourth ports; and
providing bidirectional passage of an additional signal between the third and fourth ports.

17. The method of claim 16, wherein the first and second filter networks provide:
a first impedance between the first port and the fourth port;
a second impedance between the second port and the fourth port; and
a third impedance between the third port and the fourth port.

18. The method of claim 16, wherein the first and second filter networks comprise first and second bias tee networks.

19. The method of claim 18, wherein:
the first bias tee network comprises a first LC network coupling the first port, the fourth port and the first node; and
the second bias tee network comprises a second LC network coupling the second port, the third port and the second node.

20. The method of claim 19, wherein:
the first LC network comprises a first capacitance coupled between the first and second ports and a first inductance coupled between the first node and the fourth port; and
the second LC network comprises a second capacitance coupled between the second port and the second node and a first inductance coupled between the second node and the third port.

* * * * *